United States Patent
Wang

(10) Patent No.: US 10,820,144 B1
(45) Date of Patent: Oct. 27, 2020

(54) MESSAGE DISTRIBUTION SERVICE

(71) Applicant: RHIZOMENET PTY. LTD., Melbourne (AU)

(72) Inventor: Yue Wang, Melbourne (AU)

(73) Assignee: RHIZOMENET PTY. LTD., Melbourne (AU)

( * ) Notice: Subject to any disclaimer, the term of this patent is extended or adjusted under 35 U.S.C. 154(b) by 0 days.

(21) Appl. No.: 16/717,091

(22) Filed: Dec. 17, 2019

(51) Int. Cl.
*H04W 4/21* (2018.01)
*H04W 4/021* (2018.01)
*H04W 4/23* (2018.01)
*H04W 68/00* (2009.01)
*H04W 4/12* (2009.01)
*H04N 21/2187* (2011.01)
*G06T 11/00* (2006.01)

(52) U.S. Cl.
CPC ............. *H04W 4/021* (2013.01); *G06T 11/00* (2013.01); *H04N 21/2187* (2013.01); *H04W 4/12* (2013.01); *H04W 4/23* (2018.02); *H04W 68/005* (2013.01)

(58) Field of Classification Search
CPC ....... H04W 4/21; H04W 12/003; H04W 4/02; H04W 4/021; H04W 4/206; H04L 67/22; H04L 61/1511; H04L 51/38; H04L 51/20; G06Q 30/0277; G06Q 30/0261; G06Q 30/0246; G06Q 30/0201; H05B 37/0272; H05B 37/0263
USPC ...... 455/456.3, 416, 466; 709/22.3; 715/716
See application file for complete search history.

(56) References Cited

U.S. PATENT DOCUMENTS

2012/0270563 A1* 10/2012 Sayed .................... H04W 4/12
455/456.3

* cited by examiner

*Primary Examiner* — Phuoc H Doan

(57) ABSTRACT

A computer-implemented method of distributing location-based message contents over a messaging system and that are displayable on consumer devices present at associated locations. The method comprises, for each message of a set of messages, obtaining a message content, defining for the message a multiplicity of message locations, and adding the message content and the defined locations to a message distribution database or set of linked databases that is or are searchable by location. The method further comprises receiving from a consumer device a consumer update request including a location of the consumer device or a consumer defined location, searching the database using the consumer device location or consumer defined location to identify, for each of one or more of said messages, a single message location that is within a first predefined range of the consumer device location or consumer defined location and/or that is closest to the consumer location or consumer defined location, and sending the identified message location (s) to the consumer device.

12 Claims, 3 Drawing Sheets

US 10,820,144 B1

MESSAGE DISTRIBUTION SERVICE

FIELD OF THE INVENTION

The present invention relates to a location-based message distribution service for distributing messages to a multiplicity of end-user devices. In particular, though not necessarily, the invention relates to such a service for delivering messages to mobile end-user devices where the messages are presented on a display using augmented reality.

BACKGROUND

The majority of messaging applications provided for end-user mobile devices such as smartphones are essentially agnostic in a geographical sense. A user will receive a message sent to him or her regardless of their location. However, users of messaging services are often using devices with access to additional data, such as location. Messaging services have begun to take advantage of this, offering features such as location tagged messages (i.e. messages associated with a particular location).

An example message flow for a single message in such an app is shown in FIG. 1. The message flow involves a sending client 110, a server 120, and a receiving client 130. In step 101, the sending client 110 creates a message, which includes details of a particular location. In step 102, the sending client 110 sends this message to the server 120. In step 103, the server 120 forwards this message to the receiving client 130, which notifies the user in step 104. The receiving client displays the message in step 105 in some kind of location-identifying view, e.g. on a map or in an AR view, at a location corresponding to the associated location. The message may only be available for viewing (i.e. the message content delivered to the client) when the receiving client 120 is present at or in the vicinity of the associated location.

SUMMARY

The present invention flows from a realisation that some message creators may want to attach multiple locations to a single message. With conventional location-based messaging services, this would require the sending of the message multiple times, each with a different location (e.g. the different location attached. This places a large burden on the message sender, particularly where there are many hundreds or even thousands of locations associated with a message. The conventional services also give rise to the problem that a message with multiple locations will cause corresponding multiple notifications to be made to the receiving client. This is likely to be confusing for the receiver and would inevitably reduce the quality of the user experience.

According to a first aspect of the present invention there is provided a computer-implemented method of distributing location-based message contents over a messaging system and that are displayable on consumer devices present at associated locations. The method comprises, for each message of a set of messages, obtaining a message content, defining for the message a multiplicity of message locations, and adding the message content and the defined locations to a message distribution database or set of linked databases that is or are searchable by location. The method further comprises receiving from a consumer device a consumer update request including a location of the consumer device or a consumer defined location, searching the database using the consumer device location or consumer defined location to identify, for each of one or more of said messages, a single message location that is within a first predefined range of the consumer device location or consumer defined location and/or that is closest to the consumer location or consumer defined location, and sending the identified message location (s) to the consumer device.

Embodiments provided for by the invention allow for a greatly reduced messaging flow when providing multi-location messages over a location-based messaging service, as well as simplifying the multi-location message creation and management processes.

The method may comprise sending the message content to the consumer device if either (a) said consumer device location or consumer defined location is within a second predefined range of a sent identified message location, or (b) the consumer device sends a further consumer update request containing a new location of the consumer device or a consumer defined location that is within said second predefined range of a sent identified message location. The method may further comprise receiving the message content at the consumer device, and displaying the message content on a display as augmented reality content. The display may display real-time video captured by a device camera. Alternatively, the display may be a transparent or semi-transparent display.

The step of defining for the message a multiplicity of message locations may comprise defining a message location search term, performing a search to identify multiple locations for the search term, and defining these multiple locations as said multiplicity of message locations. The step of defining a message location search term may comprise receiving a search term from a message sending client, together with said message content.

The step of performing a search may comprise submitting said location search term to a web mapping service using a service API and receiving in response a results list including said multiple locations.

The method may comprise receiving the identified message location(s) at the consumer device and displaying these on a device display as an overlay on a map.

The method may comprise, for an identified message, defining a message appearing time such that message content sent to a consumer device is only available to the consumer after the appearing time.

The method may comprise, for an identified message, defining a message disappearing time such that message content sent to a consumer device is only available to the consumer prior to the disappearing time.

The method may comprise defining for one or more of the messages of said set of messages a passcode such that message content sent to a consumer device is only available after the passcode has been input to the consumer device.

The method may comprise defining for one or more of the messages of said set of messages a collection number defining the number of times that a message content can be collected by consumer devices at a given one of the defined locations, or defining a number of users that can collect a message content with their respecting consumer devices.

The step of searching the database may comprise identifying, for each of one or more of said messages, multiple message locations within said first predefined range and selecting as said single location the closest location to the consumer location or consumer defined location.

According to a second aspect of the invention there is provided a computer implemented method of presenting message content as augmented reality content on a display of a user device, the method comprising:

for message content associated with multiple locations, identifying a location closest to the user device;

sending to the user device a notification identifying said closest location;

displaying said closest location on said display;

making a determination that the user device is present at or near said closest location;

sending said message content to the user device; and presenting the message content as augmented reality on said display.

DETAILED DESCRIPTION

The following disclosure is concerned with a messaging application or "app" in which messages may be associated with location data, and where users can view messages in a geographic region (e.g. close to the user) via an interface. The interface may display a list of messages in the geographic region, display the messages overlaid on a map, or display the messages in an "augmented reality" view (i.e. with the message appearing to float in front of the associated location on displayed graphics, e.g. as captured by a device camera). More particularly, the disclosure is concerned with messages that are each associated with multiple locations, possible even a very large number of locations. It will of course be appreciated that an augmented reality (AR) message can be displayed using a number of different approaches, e.g. under a displayed location in the case where the device is in the basement of a building or on a location as a virtual billboard.

Consider the example of a chain of supermarkets which wishes to use the location-based messaging service to provide a given message content to customers in their marketing list, with the location tagged as the supermarket stores in the chain. The message content might include for example a discount code that a receiver can use to obtain a discount on items purchased (e.g. "Celebrate Valentine's Day; discount code 12345").

Figure 1:
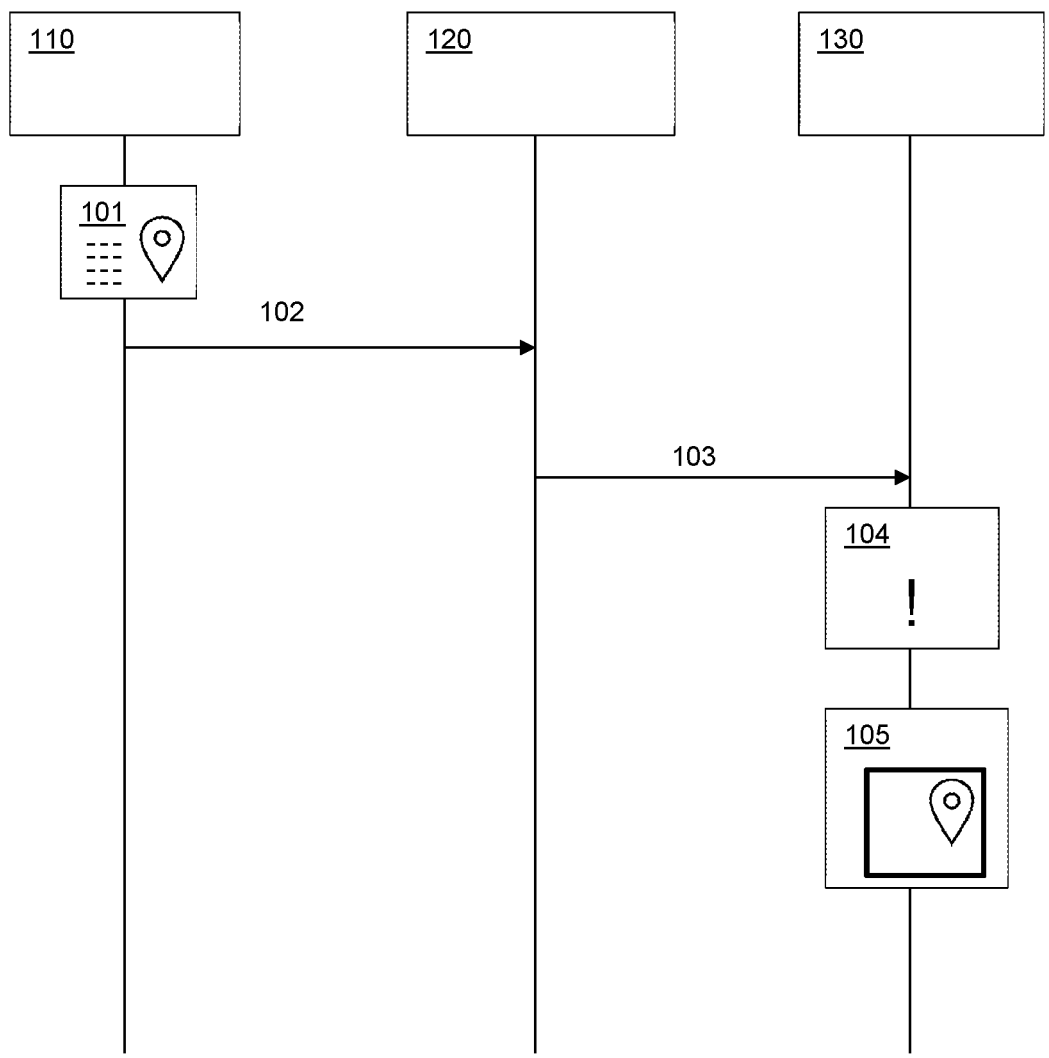
FIG. 1 is a diagram of message flow according to an exemplary prior art method.
Figure 2:
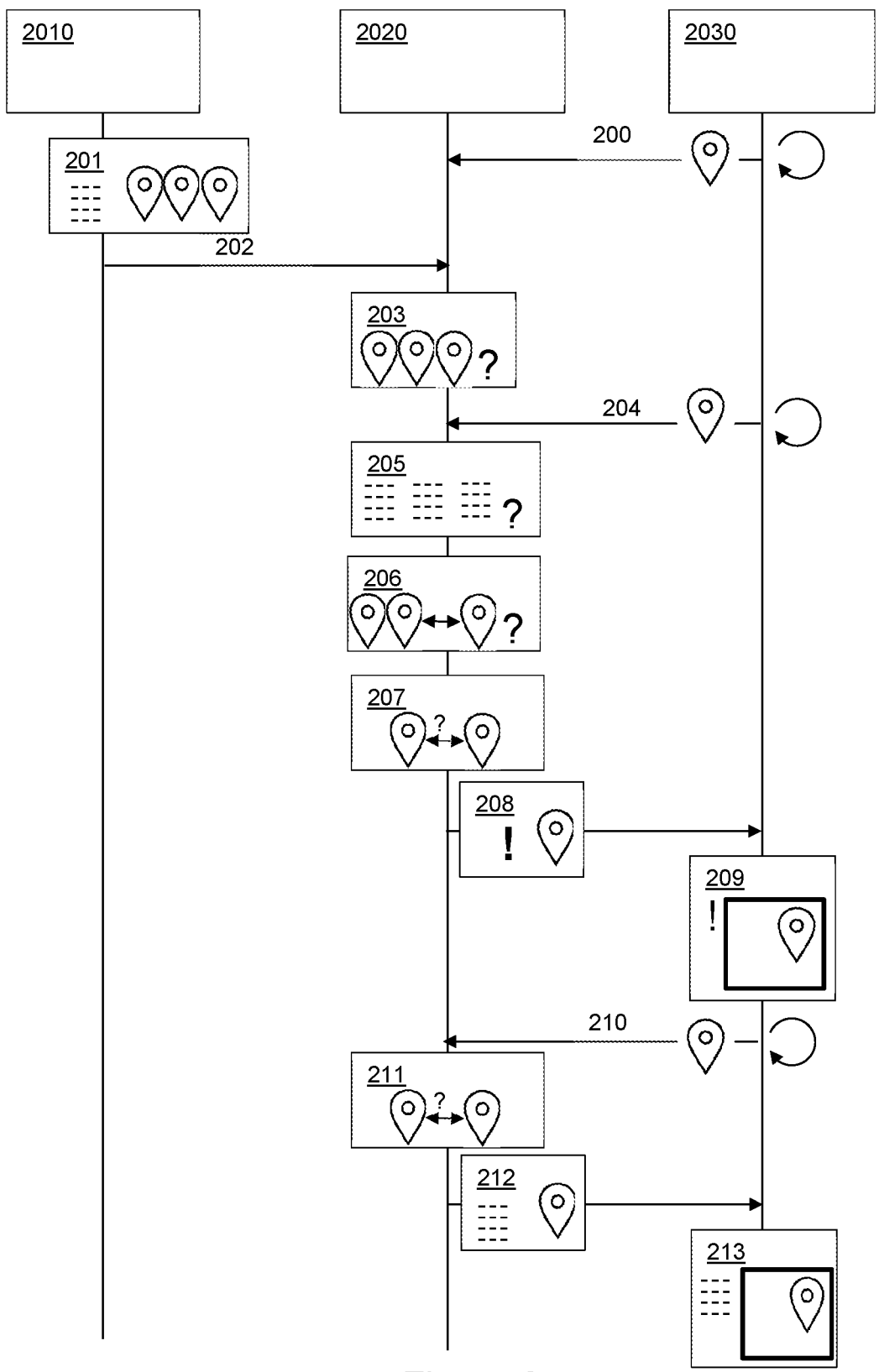
FIG. 2 is a diagram of message flow in an exemplary method.
Figure 3:
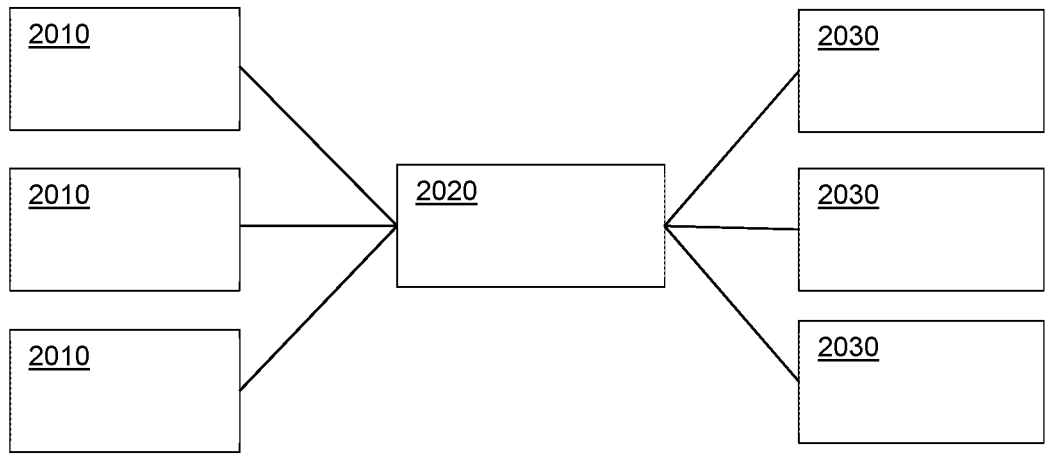
FIG. 3 is a network diagram showing connections between the entities involved in FIG. 2.

FIG. 2 illustrates a messaging flow that can be used for this purpose, whilst FIG. 3 shows an exemplary network on which the method could be implemented. The network comprises a plurality of sending clients 2010, a server 2020 (which may be a server cluster or server cloud), and a plurality of receiving clients 2030. The sending client may also be capable of receiving messages, and the receiving client may also be capable of sending messages—the names simply refer to their roles in the method presented. The clients may be smartphones, tablets, PCs, wearables including wrist worn devices, etc. Connectivity between clients and the server is provided by any suitable communications network(s). For example, the clients may be connected to the Internet via cellular or WiFi networks, whilst the server may be coupled to the Internet via an enterprise network and a broadband network.

Referring again to FIG. 2, in step 200, each receiving client 2030 periodically sends its location to the server 2020. This might result from a user opening the messaging app on his or her device, or selecting a refresh option. Upon receipt of the message from the receiving client, the server will identify any "personal" messages previously sent to the receiving client, e.g. by the sending clients 2010. If these have a location associated with them, and if the receiving client is not in that location, only a message notification will be sent (possibly with certain other data such as a location "card" including, for example, a location street address). This might indicate the location of the message which can be displayed on a map at the receiving client's device or as an item in a message list. If the receiving client is however in the associated location (or more typically with a given range of that location, e.g. 100*m*), the message content will be sent to the receiving client such that it can be displayed on the receiving device, e.g. using an augmented reality (AR) approach.

In step 201, one of the sending client 2010 chooses to create a "multi-position" message, containing message content that is to be associated with a set of locations (this is called a "multi-position message", as it is associated with multiple locations).

In step 202, the sending client 2010 sends this multi-position message to the server 2020. This may be done using a "business platform" interface having a field or fields for the message content and a field identifying the locations, e.g. "supermarket name".

In step 203, the server identifies the multiple locations associated with the information provided by the sending client in the location field. These might be, for example, the addresses of stores in the chain and their geographic coordinates, i.e. latitude and longitude. The server may perform these steps using an appropriate API, such as the Google™ mapping service API. The resulting list of locations are added to an "Atlas" database, together with links to the associated message content. As further multi-position messages are sent by the same or different sending clients, the respective locations and content links are identified by the server and the Atlas updated. The result is an Atlas database containing multiple locations associated with various message content. These messages are referred to here as "business multi-position messages", with the intended recipients being referred to as consumers (e.g. the users of the receiving clients are considered to be consumers of the business multi-position messages). Businesses may pay a subscription to use this service (via their respective sending clients 2010), or may pay on a per-message basis, or using some other payment model.

It will be appreciated that the Atlas creation process is dynamic, and that the location of step 203 in the flow is merely exemplary.

In step 204, the server 2020 receives a further location update message from a given receiving client 2030. Once again, the server will identify any personal messages destined for the receiving client and deliver a notification and or message content as described above.

In step 205, the server will also determine which if any of the multi-position messages are intended for the receiving client 2030. If the number of multi-position messages is small, all messages may be identified. However, it is more likely that a subset of the complete multi-message set will be identified. This subset may be identified by, for example, matching metadata associated with respective messages (e.g. submitted by the sending client with the message request) against receiving client metadata (e.g. user behaviour, stated preferences, etc).

In steps 206 and 207, the server determines which of the identified (intended) messages should actually be notified or sent to the receiving client. For each of the identified multi-position messages, the server determines at step 206 the location associated with that multi-position message that is closest to the client. The server then determines 207, for each of those locations, whether the location is within a "notification distance" of the client, and whether it is within a "sending distance" of the client (where the notification distance is greater than the sending distance, e.g. 50 km notification distance and 100 m sending distance). Alternatively, the two substeps may be performed in the opposite order—e.g. for each multi-position message the server first determines whether there are any locations within the notification distance and/or the sending distance, and then, for each message having at least one location within the notification distance, the server determines which location associated with that message is the closest.

In this example, the closest location is within the notification distance, so in step 208, the server sends a notification of the multi-position message to the receiving client. This notification comprises at least information regarding the closest location of the multi-position message, and may comprise additional data such as a message summary and/or the identity of the message sender. In step 209, the receiving client notifies the user of the closest location of the multi-position message, e.g. by display on a map or on an augmented reality display (as described in further detail later). At this stage, the user is aware that there is a message "waiting for them" at a particular location, but cannot access the contents of the message until they are closer to the location, i.e. within the sending distance.

In step 210, the receiving client sends a further location update, and in step 211 the server repeats steps 206 and 207 for this further location update, i.e. identifying the closest location of each multi-position message, and determining whether it is within the notification and/or sending distance.

In this example, the receiving client is within the sending distance, so in step 212, the server sends the message content of the multi-position message to the client, together with information regarding the closest location of the multi-point message (which may be a reference to the notification sent in step 207). In step 213, the receiving client displays the message to the user in an augmented reality interface. This may require the user to select a notification displayed in the AR interface, which then brings up the message contents.

Steps 206 (determining the closest location) and 207 (determining whether the closest location is within the notification and/or sending distance) will be performed each time the receiving client sends a location update, and step 205 will also be repeated to identify any new messages (which may be done in response to a location update, on a schedule, or in response to some other event).

In step 205, the server may only identify messages that have not yet been sent to the receiving client, and in step 206 the server may only consider the sending distance when determining whether to send a message or notification for a message which has already been notified to the receiving client.

If a location update places the receiving client within sending distance of a message which has not yet been notified to that client, then the server may include the message contents with the notification (effectively proceeding directly to step 212 from step 207).

In step 206, where a receiving client has already been notified of a multi-position message, the server may determine whether another of the locations is closer to the client than the previous closest location, and if so the server may resent the notification if that closest location is within the notification distance.

The information representing the location may be GPS coordinates or another suitable representation.

Instead of determining notification distance based on the actual location of the receiving client, the receiving client may send a request for notifications around a user-defined location, and in steps 206 and 207 the server may determine the "closest location" and "notification distance" based on that user-defined location. This may be useful, for example, if a user wishes to determine whether there are any messages close to a location they are travelling towards, before they actually get there. The user may identify the user-defined location by swiping across a displayed map. The "notification distance" may also be user-definable, i.e. provided in a location update by the receiving client, e.g. a user may define the distance by enlarging or reducing the size of a displayed map area. The "sending distance" may still be determined for the actual location of the device, even if the receiving client provides a user-defined location.

The message contents may include multimedia content, e.g. any combination of text, images, video, audio, additional location data (i.e. a location other than the associated location), etc. The message contents may include only static content (i.e. the same for each location of the set), or it may include both static and dynamic content, where the dynamic content depends on which of the set of associated locations is associated with the single-position message generated by the server. For example, the message contents may include a first image which is a product advertisement (static content), and a set of second images which is a picture of the storefronts of the associated locations (dynamic content), defined such that only the picture for the associated location will be sent by the server to the receiving client. Alternatively, the message contents may include text containing both static and dynamic content, e.g. "Come to your local shop at ((address)) for great deals today!", where the data sent to the server comprises a lookup table of addresses for each of the set of associated locations, and the server substitutes the relevant address for "((address))" in the message contents prior to sending the single-position message to the receiving client.

While the above example has referred to a "sending client" and a "server", the multi-position messages may be directly created at the server, rather than originally obtained from a sending client. For example, this may occur in a setup where an advertiser instructs the operator of the server to generate a message on their behalf.

In steps 209 and 213, the message or message notification is displayed on an augmented reality display. An augmented reality display is one which overlays display graphics on a real world environment. There are broadly two types of augmented reality displays. In the first type, display graphics are overlaid on an image (generally a live image) taken from a camera. This is the type commonly seen on AR apps for smartphones. In the second type, graphics are displayed on a transparent or translucent display, which the user can look through to see the real world beyond. This type is used for AR headsets, "smart glasses", or "smart windows", and has been proposed for "smart contact lenses". The above disclosure could apply to any of the AR examples given, and will also be applicable to future AR technologies with appropriate modification including holographic displays.

Message content may be associated with a passcode, such as a password or PIN code, such the content can only be viewed or accessed after a receiver has entered the passcode into his or her device. The passcode may be derived from biometric data such as a fingerprint or the image of a face. In the case of a password, the user's device may provide a means for recovering a forgotten password, such as by way of displaying a password hint.

Figure 4:
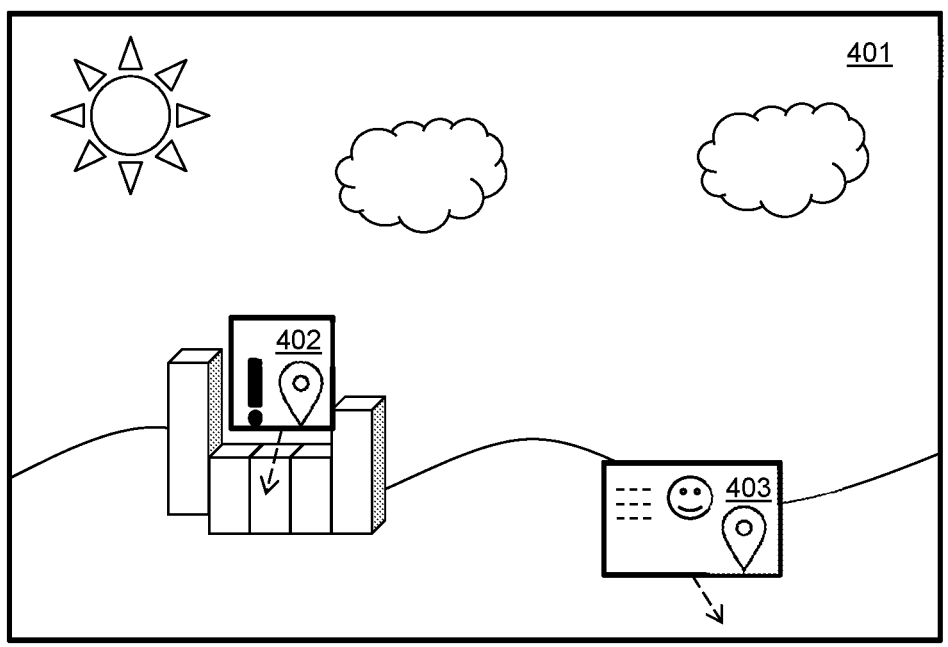
FIG. 4 is an exemplary display of an augmented reality interface of a receiving client.

FIG. 4 shows an example AR interface displaying messages and message notifications according to the above examples. The AR interface comprises a "real world view" 401 (i.e. a camera feed, or a transparent display which allows viewing of the real world directly), over which graphics are presented representing a message notification 402, and a message 403. The message notification corresponds to a first multi-position message for which the closest location is only within the notification distance, and the message 403 corresponds to a multi-position message for which the closest location is within the sending distance. Each of the message notification 402 and the message 403 are displayed in a location corresponding to the location associated with the respective message. The message 403 is displayed including a selection of the message content, and may include options to view further message content (e.g. if there is more than can be shown in the display). The message notification 402 may of course not be displayed on the AR interface and may be visible only as an overlay (e.g. pin) on a map view or in a message notification feed list.

The invention claimed is:

1. A computer-implemented method of distributing location-based message contents over a messaging system that are displayable on consumer devices present at associated locations, the method comprising:
    for each message of a set of messages,
        obtaining a message content and a message location search term;
        submitting the message location search term to a web mapping service so that a service application programming interface (API) searches with the message location search term;
        receiving a result list including a plurality of message locations for the message; and
        adding the message content and the plurality of message locations to a message distribution database or a set of linked databases that is or are searchable by a location;
    receiving from a consumer device a first consumer update request including a first location of the consumer device or a first consumer defined location;
    searching the message distribution database or the set of linked databases using the first location of the consumer device or the first consumer defined location to identify, for the message of the set of messages, a single message location that is within a first predefined range of the first location of the consumer device or the first consumer defined location and that is closest to the first location of the consumer device or the first consumer defined location, or the single message location that is closest to the first location of the consumer device or the first consumer defined location; and
    sending the identified single message location for each of the messages to the consumer device.

2. The method according to claim 1, further comprising:
    sending the message content to the consumer device if either
        the first location of the consumer device or the first consumer defined location is within a second predefined range of the sent identified single message location, or
        the consumer device sends a second consumer update request containing a second location of the consumer device or a second consumer defined location that is within the second predefined range of the sent identified single message location.

3. The method according to claim 2, further comprising:
    receiving the message content at the consumer device; and
    displaying the message content on a display of the consumer device as an augmented reality content.

4. The method according to claim 3, wherein the display displays a real-time video captured by a device camera.

5. The method according to claim 3, wherein the display is a transparent display.

6. The method according to claim 1, wherein obtaining a message location search term comprises receiving the message location search term from a message sending client, together with the message content.

7. The method according to claim 1, further comprising receiving the identified single message location at the consumer device and displaying the identified single message location on a device display as an overlay on a map.

8. The method according to claim 1, further comprising, for an identified message, defining a message appearing time such that a message content sent to a consumer device is only available to a consumer after the appearing time.

9. The method according to claim 1, further comprising, for an identified message, defining a message disappearing time such that a message content sent to a consumer device is only available to a consumer prior to the disappearing time.

10. The method according to claim 1, further comprising, for one or more messages of the set of messages, defining a passcode such that a message content sent to a consumer device is only available after the passcode has been input to the consumer device.

11. The method according to claim 1, further comprising, for one or more messages of the set of messages, defining a collection number that defines a number of times that a message content is collected by consumer devices at one of consumer defined locations, or defining a number of users that collect a message content with respective consumer devices.

12. The method according to claim 1, wherein searching the message distribution database or the set of linked databases comprises, for each message of the set of messages, identifying multiple message locations within the first predefined range, and selecting a location closest to the first location of the consumer device or the first consumer defined location from the identified multiple message locations.

* * * * *